United States Patent Office 2,739,122
Patented Mar. 20, 1956

2,739,122
ANTIOXIDANT COMPOSITIONS

George W. Kennerly, Stamford, and Edwin O. Hook, New Canaan, Conn., assignors to American Cyanamid Company, New York, N. Y., a corporation of Maine No Drawing. Application July 29, 1953, Serial No. 371,181

8 Claims. (Cl. 252—32.7)

The present invention relates to the stabilization of organic substances against discoloration, polymerization, oxidation, development of rancidity, and other forms of deterioration resulting from the action of atmospheric oxygen thereon. More specifically, the present invention is directed to the novel stabilizers, per se, used for such purposes and to the organic compositions containing the same. Still more specifically, the present invention is concerned with novel stabilizers particularly intended to protect such organic substances at elevated temperatures.

It is well known in the art that the development of such undesirable oxidative effects may be deterred by the addition of small quantities of stabilizers or antioxidants to organic substances which are liable to discoloration, oxidation and other deteriorative effects. Among the organic substances which have been so stabilized have been fats, soaps, oils and waxes of all types; hydraulic fluids; textile softeners; paints and varnishes; petroleum products including lubricating oils, turbine oils, transformer oils, cutting oils, etc; plastic molding powders; and the like.

An example of such an antioxidant is the class of tri-substituted mono-hydroxy phenols represented by the following structural formula:

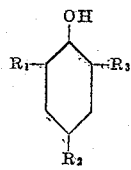

wherein $R_1$ is a member of the group consisting of aralkyl radicals and secondary and tertiary alkyl radicals containing from 4 to 12 carbon atoms; $R_2$ is an aralkyl radical or an alkyl radical containing from 1 to 5 carbon atoms; and $R_3$ is a member of the group consisting of araykyl radicals and alkyl radicals containing from 1 to 12 carbon atoms. Specific examples of such a class would comprise: 2,6-di-tertiary butyl-4-methyl phenol; 2,6-di-tertiary butyl-4-ethyl-phenol; 2,4,6-tri-(α-methyl benzyl)phenol; 2,4-dimethyl-6-tertiary-butyl phenol; 2,6-di-isopropyl-4-methyl-phenol; 2,6-di-tertiary-amyl-4-methyl-phenol; 2,4,6-tri-tertiary amyl phenol; 2,6-di-tertiary-amyl-4-tertiary butyl phenol; 2-tertiary-butyl-4,6-di-methyl phenol; 2,4,6-tri-tertiary butyl phenol; 2,4,6-tri-isopropyl-phenol; etc.

This class of compounds (hereinafter sometimes referred to as type A) has been found generally acceptable to the industry as antioxidants or stabilizers and their use has been varied and widespread. However, successful as they have been, these products do possess some shortcomings and it is a principal object of this invention to overcome such shortcomings and to furnish the industry with an even more acceptable product.

For example, the nature and chemical construction of these compounds is such that their manufacture is not simple or inexpensive and, consequently, the cost economics have militated in some cases against their more widespread use. Therefore, it is another principal object of the present invention to provide a novel composition possessing an equivalent or increased antioxidant or stabilizing effect at decreased cost.

Additionally in some cases, in an effort to obtain the desired inhibiting results, rather large percentages of the additive, on the order of 5% or higher, are occasionally required. Unfortunately, it could happen that the solubility of the additive in the particular organic substance to be stabilized may not be high enough and, consequently, optimum results are not obtainable inasmuch as sufficient amounts of the additive could not be conveniently incorporated in the organic substance. It is, therefore, still another principal object of the present invention to provide a novel composition possessing an equivalent or increased anti-oxidant or stabilizing effect while using decreased amounts of the improvement additive.

We have found that if small amounts of a metallic salt of a diester of dithiophosphoric acid are added to an organic composition containing the tri-substituted mono-hydroxy phenols, a remarkable synergistic effect is noted whereby wholly unexpected and disproportionately increased anti-oxidant and stabilizing effects are realized even though the total amount of the improvement additives is not increased or even is drastically decreased.

In this way, the cost of the antioxidants is reduced, particularly due to the relative inexpensiveness of the dithio-phosphates; equivalent quantities are found sufficient for more demanding purposes; small quantities are found sufficient for equivalent purposes; and solubility problems for organic substances are lessened.

These salts of diesters of dithiophosphoric acid (hereinafter sometimes refered to as type B) are well-known in the industry and possess the following generic structural formula:

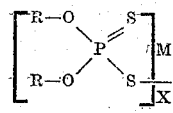

wherein R is a cycloalkyl radical or a primary or secondary alkyl radical containing from 3 to 12 carbon atoms; M is a polyvalent metal; and X is the valence of M.

Among the more specific examples of this class of salts of dialkyl dithiophosphates may be cited, as illustrative but not limitative, the salts of: dibutyl dithiophosphoric acid; diamyl dithiophosphoric acid; di-(4-methyl pentyl-2) dithiophosphoric acid; di-(2-methyl pentyl-1) dithiophosphoric acid; other di-hexyl dithiophosphoric acids; di-n-octyl dithiophosphoric acid; didecyl dithiophosphoric acid; dilauryl dithiophosphoric acid; dioctadecyl dithiophosphoric acid; dicyclohexyl dithiophosphoric acid; dicyclopentyl dithiophosphoric acid; etc.

These various dithiophosphates are used in the form of their metal salts, such as the alkaline earth metal salts. Among the various metal salts which may be employed are those of the salt-forming radicals nickel, aluminum, cadmium, tin, zinc, magnesium, calcium, strontium, barium, and others.

The proportions and concentrations of each of these constituents may be varied within wide limits and would depend to a great extent upon the specific requirements of the particular organic substance involved and upon the economic factors of the particular situation. For example, each constituent may be present in an amount as low as about 0.001% or as high as about 5.0% by weight as based on the organic substance. However, the preferable and more common range of usage has been found to be from about 0.0025% to about 2.0% by weight of each constituent as based on the weight of the organic substance. It is therefore to be observed that very small quantities of one constituent possess the properties of exhibiting the synergistic effects in the presence of widely varying quantities of the other constituent.

The invention will be further described in greater detail by the following specific examples. It is to be understood, however, that although these examples may describe in particular detail some of the specific features of the invention, they are given primarily for purposes of illustration and the invention in its broader aspects is not to be construed as limited thereto.

EXAMPLE 1

A representative of type A, namely 2,6-di-tertiary-butyl-4-methyl-phenol, and a representative of type B, namely zinc di-(4-methylpentyl-2) dithiophosphate, are used to inhibit the oxidation of a white mineral oil. The test is carried out as follows: 300 grams of the mineral oil is weighed out and to it is added an amount of each additive to bring that additive content up to the value indicated in Table I. The mixture is then placed in a cylindrical glass vessel of 40 cm. diameter and 400 cm. height with a fritted glass air-inlet tube at the bottom and an exit gas tube at the top. The vessel is then placed in a thermostated bath controlled at 155° C. and pure nitrogen is bubbled through the solution at 200 cc. per minute for 1 hour, during which time the solution reaches the bath temperature. The gas stream is then switched to air at 200 cc. per minute and the time noted. The outlet gas stream is then passed through a paramagnetic type oxygen analyzer, where its oxygen content is measured and recorded as a function of time. The time at which the solution begins to absorb oxygen is noted by the rapid drop in the oxygen content of the outlet gas stream. This time can be determined very accurately and is recorded in the tables as the "Induction Period," being the number of hours elapsed between the switch from nitrogen to air, and the rapid drop in the oxygen content of the outlet gas stream.

*Table I*

| Additive | Hours Induction Period |
|---|---|
| None | Less than one hour. |
| 0.017% Type A | 15.5 hours. |
| 0.025% Type B | 12.7 hours. |
| 0.0066% Type A+0.0125% Type B | 20.3 hours. |

EXAMPLE 2

Using the same test method and the same additives as in Example 1 in 300 grams of di-(2-ethylhexyl) sebacate at 180° C., similar unexpected results were noted.

EXAMPLE 3

Using the same test method as in Example 1 in a white mineral oil at 155° C. using 2,6-di-tert-butyl-4-ethyl-phenol as a representative of type A and zinc-di-(4-methylpentyl-2) dithiophosphate as a representative of type B the following results were noted:

*Table II*

| Additive | Hours Induction Period |
|---|---|
| None | Less than 1 hour. |
| 0.0067% Type A | 8.7 hours. |
| 0.025% Type B | 12.7 hours. |
| 0.0067% Type A+0.025+Type B | 60.1 hours. |

EXAMPLE 4

Using the same test method as in Example 1 in a white mineral oil at 155° C. using 2,4,6-tri-(α-methylbenzyl) phenol as a representative of type A and zinc di-(4-methylpentyl-2) dithiophosphate as a representative of type B, similar disproportionate results were noted.

EXAMPLE 5

Using the same test method described in Example 1, but using a temperature of 155° C., the combination of 2,4-dimethyl-6-tertiary-butyl-phenol and a zinc dihexyl dithiophosphate was used to stabilize a paraffin wax. Somewhat comparable results to those set forth in Example 1 were obtained.

The antioxidant compositions of the present invention have been found to be effective at temperatures in excess of 100° C. and the synergistic effect is truly marked at more elevated temperatures. Consequently, the additives herein described are particularly applicable to those cases wherein an organic substance, such as a paraffin wax or a cutting oil, is intended to be used at elevated temperatures.

Although we have described but a few specific examples of our inventive concept and a few results of tests thereon, we consider the invention not to be limited thereto and that suitable changes, variations and modifications may be made without departing from the spirit and scope of the invention.

We claim:

1. An organic substance from the group consisting of mineral oils, diester synthetic lubricating oils and waxes normally liable to deteriorative effects due to the action of atmospheric oxygen having incorporated therein a synergistic antioxidant composition consisting of from about 0.001% to about 5% by weight of a tri-substituted mono-hydroxy phenol having the formula

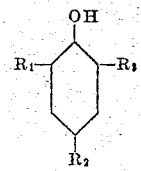

wherein $R_1$ is a member of group consisting of aralkyl radicals and tertiary alkyl radicals containing from 4 to 12 carbon atoms; $R_2$ is a member of the group consisting of aralkyl radicals and alkyl radicals containing from 1 to 5 carbon atoms; and $R_3$ is a member of the group consisting of aralkyl radicals and alkyl radicals containing from 1 to 12 carbon atoms; and from about 0.001% to about 5% by weight of a metallic salt of a diester of dithiophosphoric acid having the formula

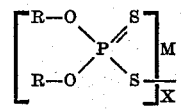

wherein R is a member of the group consisting of cycloalkyl radicals and alkyl radicals containing from 3 to 12 carbon atoms; M is zinc; and X is the valence of M.

2. An organic substance from the group consisting of mineral oils, diester synthetic lubricating oils and waxes normally liable to deteriorative effects due to the action of atmospheric oxygen having incorporated therein a synergistic antioxidant composition consisting of from about 0.0025% to about 2% by weight of a tri-substituted mono-hydroxy phenol having the formula

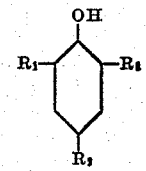

wherein $R_1$ is a member of group consisting of aralkyl radicals and tertiary alkyl radicals containing from 4 to 12 carbon atoms; $R_2$ is a member of the group consisting of aralkyl radicals and alkyl radicals containing from 1 to 5 carbon atoms; and $R_3$ is a member of the group consisting of aralkyl radicals and alkyl radicals containing from 1 to 12 carbon atoms; and from about 0.0025% to about 2% by weight of a metallic salt of a diester of dithiophosphoric acid having the formula

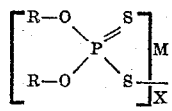

wherein R is a member of the group consisting of cycloalkyl radicals and alkyl radicals containing from 3 to 12 carbon atoms; M is zinc; and X is the valence of M.

3. An organic substance as defined in claim 1 wherein the antioxidant composition comprises 2,6-di-tertiary-butyl-4-methylphenol and a zinc dihexyl dithiophosphate.

4. An organic substance as defined in claim 1 wherein the antioxidant composition comprises 2,6-di-tertiary-butyl-4-ethylphenol and a zinc dihexyl dithiophosphate.

5. An organic substance as defined in claim 1 wherein the antioxidant composition comprises 2,4,6-tri-($\alpha$-methylbenzyl) phenol and a zinc dihexyl dithiophosphate.

6. An organic substance as defined in claim 1 wherein the antioxidant composition comprises a 2,4,6-trialkylated monohydroxy phenol and a zinc salt of a dialkyl ester of dithiophosphoric acid.

7. An organic substance as defined in claim 1 wherein the antioxidant composition comprises a 2,4,6-triaralkylated monohydroxy phenol and zinc salt of a dialkyl ester of dithiophosphoric acid.

8. An organic substance as defined in claim 1 wherein the antioxidant composition comprises 2,6-di-tertiary butyl-4-alkylphenol and zinc dihexyl dithiophosphate, said alkyl radical having less than 3 carbon atoms.

References Cited in the file of this patent

UNITED STATES PATENTS

| 2,481,487 | Adelson | Sept. 13, 1949 |
| 2,552,570 | McNab et al. | May 15, 1951 |
| 2,595,170 | Rudel et al. | Apr. 29, 1952 |